(12) United States Patent
Cho

(10) Patent No.: US 12,068,705 B2
(45) Date of Patent: Aug. 20, 2024

(54) APPARATUS AND METHOD FOR INVERTER CONTROL

(71) Applicant: LS ELECTRIC CO., LTD., Anyang-si (KR)

(72) Inventor: Byung Geuk Cho, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 366 days.

(21) Appl. No.: 17/440,515

(22) PCT Filed: Aug. 13, 2019

(86) PCT No.: PCT/KR2019/010306
§ 371 (c)(1),
(2) Date: Sep. 17, 2021

(87) PCT Pub. No.: WO2020/189862
PCT Pub. Date: Sep. 24, 2020

(65) Prior Publication Data
US 2022/0158580 A1    May 19, 2022

(30) Foreign Application Priority Data

Mar. 19, 2019    (KR) ........................ 10-2019-0031341

(51) Int. Cl.
*H02P 27/08*    (2006.01)
*H02M 7/5395*   (2006.01)
*H02P 25/026*   (2016.01)

(52) U.S. Cl.
CPC .......... *H02P 27/08* (2013.01); *H02M 7/5395* (2013.01); *H02P 25/026* (2013.01)

(58) Field of Classification Search
CPC ...... H02P 27/08; H02P 25/026; H02M 7/5395
See application file for complete search history.

(56) References Cited

U.S. PATENT DOCUMENTS

| | | | | |
|---|---|---|---|---|
| 6,509,711 B1 * | 1/2003 | Zaremba | ............... | H02P 21/141 |
| | | | | 318/803 |
| 6,975,087 B1 * | 12/2005 | Crabill | ................... | G05B 11/42 |
| | | | | 318/590 |
| 8,803,465 B1 * | 8/2014 | Smith | ..................... | G05B 11/30 |
| | | | | 700/189 |

(Continued)

FOREIGN PATENT DOCUMENTS

| CN | 104135181 A | 11/2014 |
|---|---|---|
| CN | 108233757 A | 6/2018 |

(Continued)

OTHER PUBLICATIONS

Office Action for related Chinese Application No. 201980094170.1; action dated Jun. 4, 2024; (6 pages).

*Primary Examiner* — Rina I Duda
(74) *Attorney, Agent, or Firm* — K&L Gates LLP

(57) ABSTRACT

An apparatus and a method for inverter control are disclosed. A method according to an embodiment of the present disclosure comprises: discretizing, in a continuous time domain, a voltage equation for a motor in a stationary coordinate system in which a zero-order hold and time delay is reflected; and determining a voltage equation for the motor in a synchronous coordinate system in a discrete time domain by reflecting the position and speed of a rotor of the motor.

11 Claims, 11 Drawing Sheets

(56) References Cited

U.S. PATENT DOCUMENTS

| | | | |
|---|---|---|---|
| 2009/0196629 A1 | 8/2009 | Zheng et al. | |
| 2012/0001582 A1* | 1/2012 | Park | G05B 13/048 |
| | | | 318/632 |
| 2014/0145665 A1* | 5/2014 | Shouji | H02P 27/06 |
| | | | 318/503 |
| 2015/0116681 A1* | 4/2015 | Ueda | G03F 7/70383 |
| | | | 355/72 |
| 2015/0288305 A1* | 10/2015 | Mendoza | H02P 27/085 |
| | | | 318/400.09 |

FOREIGN PATENT DOCUMENTS

| | | |
|---|---|---|
| CN | 108322119 A | 7/2018 |
| KR | 100866414 B1 | 11/2008 |
| KR | 20090105065 A | 10/2009 |
| KR | 101388398 B1 | 4/2014 |
| KR | 20170003208 A | 1/2017 |
| KR | 20180080730 A | 7/2018 |

* cited by examiner

APPARATUS AND METHOD FOR INVERTER CONTROL

CROSS-REFERENCE TO RELATED APPLICATIONS

The present application is a National Stage of International Application No. PCT/KR2019/010306 filed on Aug. 13, 2019, which claims the benefit of Korean Patent Application No. 10-2019-0031341, filed on Mar. 19, 2019, with the Korean Intellectual Property Office, the entire contents of each hereby incorporated by reference.

FIELD

The present disclosure relates to an inverter control apparatus and an inverter control method.

BACKGROUND

In alternating-current (AC) motor systems, digital inverters are becoming common due to the development of microprocessors and various sensors. In this case, when an instantaneous torque of a motor is controlled, magnetic flux reference control referred to as vector control is mainly applied, and performance of vector control can be determined by current control performance of the digital inverter.

Meanwhile, in the digital inverter, a sampling frequency is limited due to problems including an arithmetic operation time of a controller and heat of a power device. Therefore, when the sampling frequency of the digital inverter is not sufficiently greater than a rotation frequency of the motor, current control performance tends to be degraded or unstable. This problem is prominent in large-capacity systems or high-speed operation systems using permanent magnet motors.

That is, in a motor control system in which a sampling period is not sufficiently short, accuracy of modeling for the system is decreased, and thus there is a problem in that convergence of the inverter system on a command is degraded and a stable operating range is limited.

SUMMARY

The present disclosure is directed to providing an inverter control apparatus and an inverter control method which improve modeling accuracy of a motor control system and secure command convergence performance and stability of an inverter.

One aspect of the present disclosure provides an inverter control method including determining a first voltage equation for a motor on a stationary coordinate system in a continuous time domain, reflecting a zero-order hold (ZOH) and a time delay to the first voltage equation and determining a second voltage equation, discretizing the second voltage equation and determining a third voltage equation, reflecting a rotor position and a speed of the motor and determining a fourth voltage equation on a synchronous coordinate system in a discrete time domain, determining a transfer function of a current control closed-loop on the synchronous coordinate system in the discrete time domain from a transfer function of a current control response characteristic in the discrete time domain, and determining a transfer function of current control to be provided to an inverter using the transfer function of the current control closed-loop and the fourth voltage equation.

The first voltage equation may be determined by the following equation:

$$G_P(s) = \frac{i^s_{dqs}}{V^s_{dqs}} = \frac{1}{L_s s + R_s},$$

wherein, in this case, $G_p(s)$ may denote the voltage equation on the stationary coordinate system, $V_{dqs}^s$ may denote an input voltage on the stationary coordinate system, $i_{dqs}^s$ may denote an output current on the stationary coordinate system, $R_s$ may denote rotor resistance of the motor, and $L_s$ may denote rotor inductance of the motor.

The second voltage equation may be determined by the following equation:

$$G_T(s) = G_{ZOH}(s)G_d(s)G_P(s) = \frac{1 - e^{-sT_{samp}}}{s} e^{-sT_{samp}} \frac{1}{L_s s + R_s},$$

wherein, in this case, $G_{ZOH}(s)$ may denote a transfer function to which the ZOH is reflected, $G_d(s)$ may denote a transfer function to which the time delay is reflected, and $T_{samp}$ may denote a sampling period.

The third voltage equation may be determined by the following equation:

$$G_T(z) = Z\{G_{ZOH}(s)G_d(s)G_P(s)\}$$
$$= \frac{1}{R_s} \frac{1 - e^{-R_s T_{samp}/L_s}}{z(z - e^{-R_s T_{samp}/L_s})},$$

wherein, in this case, $\omega_e$ may denote a rotor speed of the motor.

The fourth voltage equation may be determined by the following equation:

$$G_{T'}(z) = G_T(ze^{j\omega_e T_{samp}})$$
$$= \frac{1}{R_s} \frac{1 - e^{-R_s T_{samp}/L_s}}{ze^{j\omega_e T_{samp}}(ze^{j\omega_e T_{samp}} - e^{-R_s T_{samp}/L_s})}.$$

The current control response characteristic in the discrete time domain may be designed using a low-pass filter, and the current control response characteristic may be determined by the following equation:

$$G_{closed}(z) = \frac{K}{z^2 - z + K},$$

wherein, in this case, K may denote a dynamic characteristic of an actual current with respect to a current command.

The transfer function of the current control may be determined by the following equation:

$$G_{prop}(z) = \frac{KR_s e^{j\omega_e T_{samp}}}{(1 - e^{-R_s T_{samp}/L_s})} \frac{z - z_0}{z - 1}, z_0 = e^{-R_s T_{samp}/L_s - j\omega_e T_{samp}}.$$

An inverter control method of determining a transfer function of current control, which is a control signal in a discrete time domain, so as to turn a plurality of switching devices, each outputting an alternating-current (AC) voltage of an inverter, on and off, the inverter control method comprising: discretizing a voltage equation for a motor on a stationary coordinate system, in which a zero-order hold (ZOH) and a delay are reflected, in a continuous time domain, and reflecting a rotor position and a speed of the motor and determining a voltage equation of the motor on a synchronous coordinate system in a discrete time domain.

In accordance with the present disclosure, coordinate transformation is performed in a discrete time domain during system modeling so that there is an effect in that a sampling effect can be reflected in the system modeling and a current command convergence and stability can be improved.

DETAILED DESCRIPTION

In order to fully convey a configuration and an effect of the present disclosure, exemplary embodiments of the present disclosure will be described with reference to the accompanying drawings. However, the present disclosure is not limited to the embodiments described below but may be implemented in various forms and various modifications may be made. However, the description of the present embodiment is intended to provide a complete disclosure of the present disclosure and to fully disclose the scope of the present disclosure to a person ordinary skilled in the art to which the present disclosure belongs. In the accompanying drawings, components are enlarged in size for convenience of description, and a scale of each of the components can be exaggerated or reduced.

The terms "first," "second," and the like can be used to describe various components, but the components should not be limited by these terms. These terms may be used only for the purpose of distinguishing one component from another component. For example, without departing from the scope of the present disclosure, a first component may be referred to as a second component, and similarly, the second component may also be referred to as the first component. In addition, the singular form includes the plural form unless the context clearly notes otherwise. Unless otherwise defined, the terms used in the embodiments of the present disclosure may be construed as commonly known to those skilled in the art.

Hereinafter, control of a conventional digital inverter will be described with reference to FIGS. 1 to 8, and an inverter control method according to one embodiment of the present disclosure will be described with reference to FIGS. 9 to 14.

Figure 1:
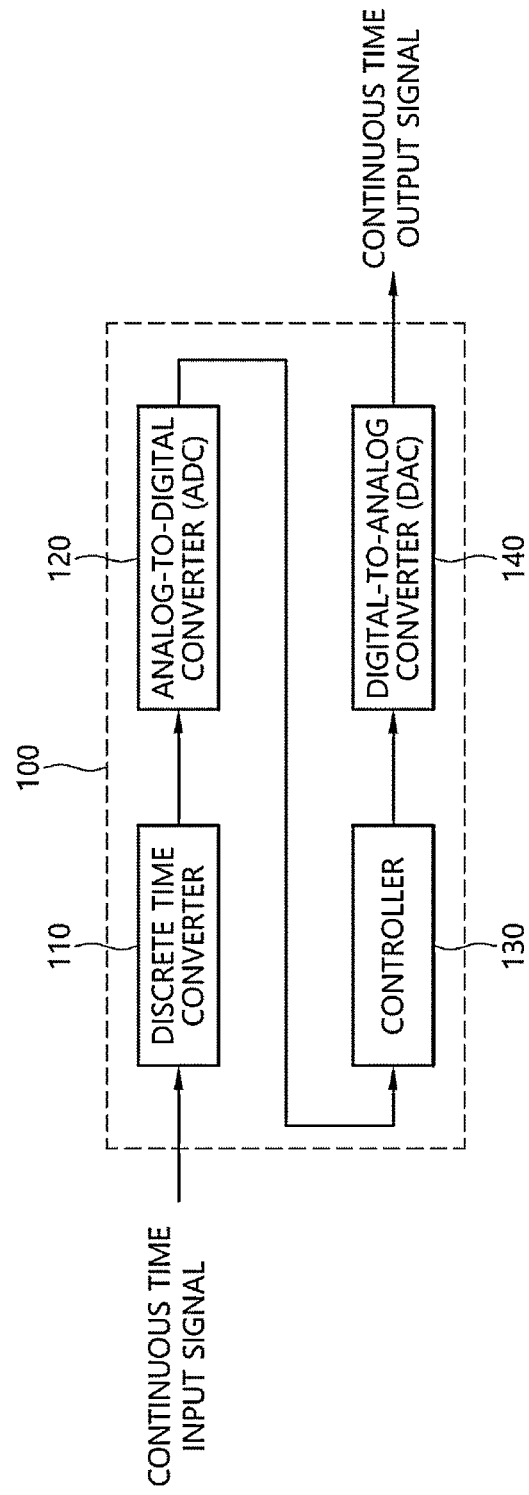
FIG. 1 is a block diagram illustrating a general inverter control system for describing signal processing of a digital inverter.

FIG. 1 is a block diagram illustrating a general inverter control system for describing signal processing of a digital inverter.

In a general inverter control system 100, a discrete time converter 110 converts continuous time input signals, such as a voltage, a current, and a rotation speed which are generated by a motor, into discrete time signals by a sample-and-hold method. The sample-and-hold method is a method of memorizing a certain signal and holding the certain signal until the next signal to be memorized is input and is a common method of converting a continuous time signal into a discrete time signal.

An analog-to-digital converter (ADC) 120 quantizes the discrete time signal to allow the discrete time signal to be arithmetically processed. The above-described quantized signal is output as another quantized signal through various arithmetic operation processes of the controller 130 and is finally converted into a continuous time output signal through a digital-to-analog converter (DAC) 140 to be output. This output signal is input to the motor to serve to control a control variable.

Figure 2:
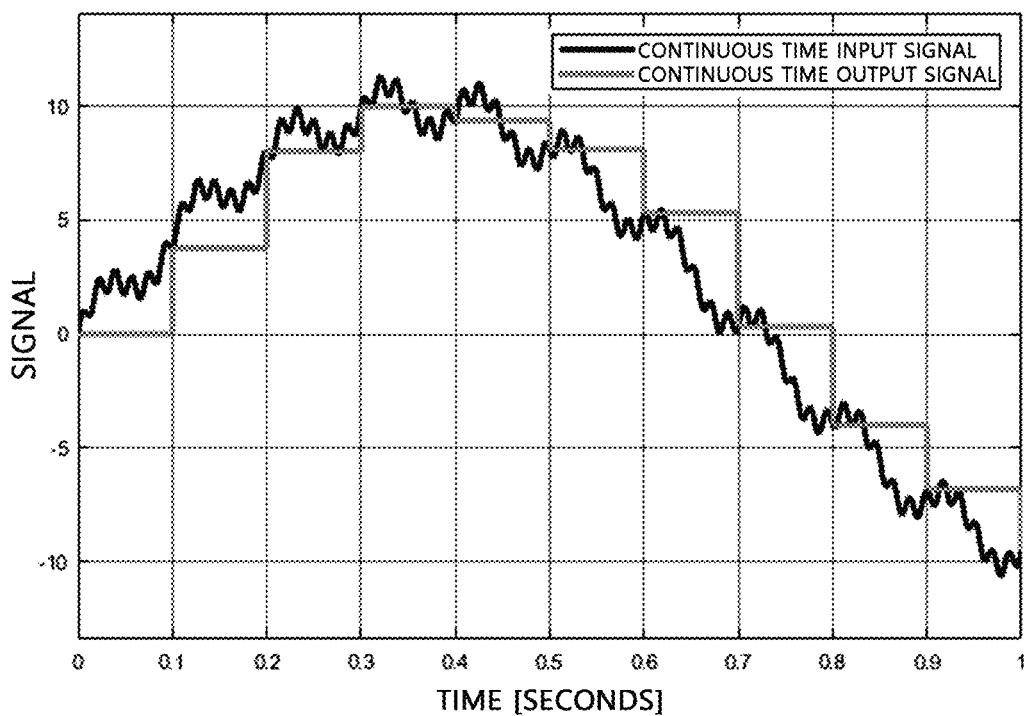
FIG. 2 is a graph showing an example of a continuous time output signal that is sampled in units of 0.1 seconds with respect to a continuous time input signal by that of FIG. 1.

FIG. 2 is a graph showing an example of a continuous time output signal that is sampled in units of 0.1 seconds with respect to a continuous time input signal by that of FIG. 1.

Figure 3:
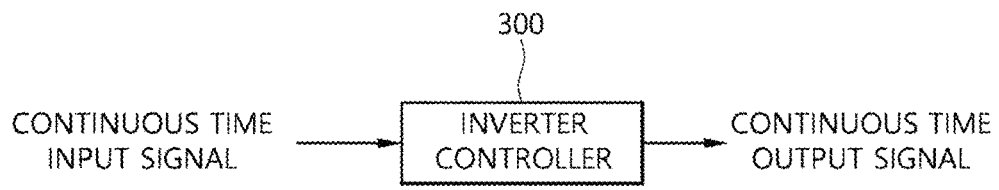
FIG. 3 is a block diagram of a system in which that of FIG. 1 is simplified in a continuous time domain.

In describing the signal processing process of the inverter in terms of an input and an output, the signal processing process refers to a composite system in which a continuous time domain and a discrete time domain are mixed. Thus, it is difficult to define a relationship between an input signal and an output signal of the inverter. However, assuming that a unit of discrete time, that is, a sampling period of the system, is sufficiently fast, an operation for a discrete time domain may be regarded as a continuous time domain, and thus as shown in FIG. 3, the signal processing process of FIG. 1 may be simplified in the continuous time domain. FIG. 3 is a block diagram of a system in which that of FIG. 1 is simplified in a continuous time domain, and the system may be regarded as an inverter controller 300 in a continuous time domain.

However, in the case of a high-speed current control system in which a sampling period is not sufficiently fast, since an operation of the digital inverter in a discrete time domain cannot be regarded as the inverter controller 300 in a continuous time domain as shown in FIG. 3, a relationship between an input and an output of the inverter cannot be modeled in the form in FIG. 3.

Therefore, in order to derive the relationship between an input and an output including an operation in a discrete time domain, one among methods of mathematically modeling a discrete phenomenon in the continuous time domain is a zero-order hold (ZOH) method.

When the sampling period is $T_{samp}$, a transfer function of the ZOH method is expressed as Equation 1 below in a continuous time frequency domain.

$$G_{ZOH} = \frac{1 - e^{-sT_{samp}}}{s} \qquad \text{[Equation 1]}$$

In this case, s denotes an operator corresponding to the Laplace transform, is used to convert a time function including a differentiation into a frequency domain, and operates in the continuous time domain.

Figure 4:
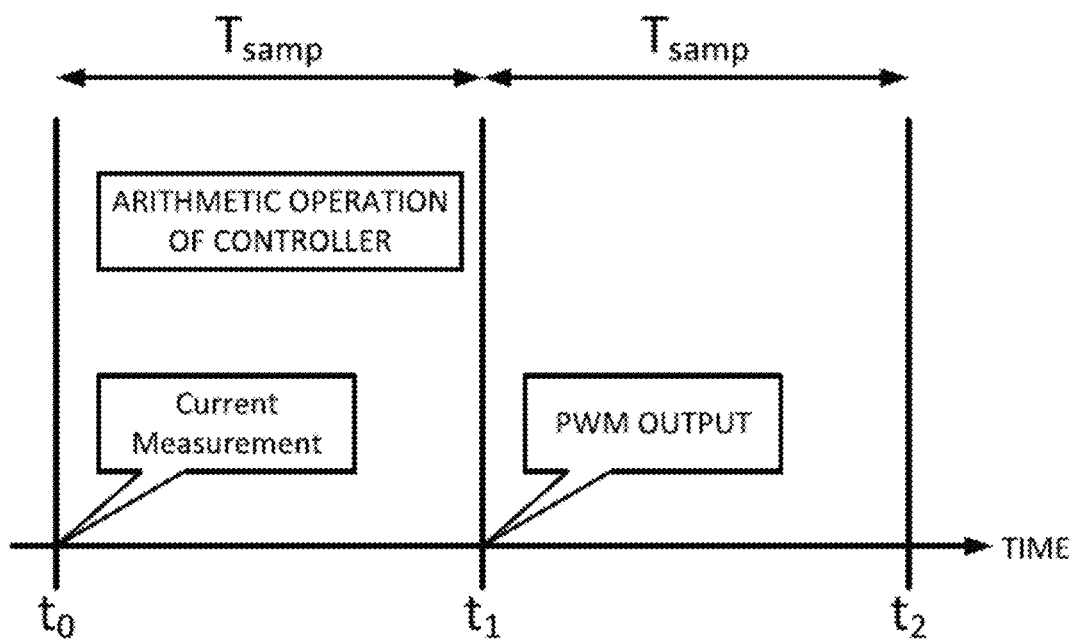
FIG. 4 is an exemplary diagram for describing a current control loop of a digital inverter.

Meanwhile, in the current control loop of the digital inverter, current information is measured and updated every sampling period. FIG. 4 is an exemplary diagram for describing a current control loop of a digital inverter.

For the current measured and updated every sampling period $T_{samp}$, an arithmetic operation necessary for current control is performed in the controller of the inverter during the sampling period $T_{samp}$. In addition, before the next sampling period arrives, an arithmetic operation of the controller on a pulse width modulation (PWM) switching indicating an output of the inverter is completed and output during the next period.

Thus, in terms of calculating an output with respect to the measured input current, a time delay corresponding to the sampling period occurs. Similar to the ZOH method, an effect of the time delay can be ignored when the sampling period is sufficiently fast, whereas the effect cannot be ignored in the high-speed current control system.

Therefore, the time delay effect should be reflected, and a transfer function for the time delay effect is expressed as Equation 2 below using the Laplace transform in the continuous time frequency domain.

$$G_d = e^{-sT_{samp}} \qquad \text{[Equation 2]}$$

As described in Equations 1 and 2, the digital inverter has the ZOH and time delay characteristics, and in consideration of these characteristics, a relational expression for input and output signals of the digital inverter of FIG. 1 may be expressed in the continuous time frequency domain.

Figure 5:
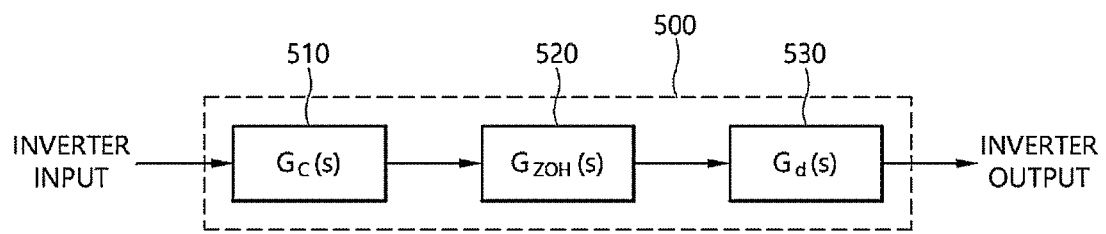
FIG. 5 is a conceptual diagram illustrating a digital inverter to which a conventional zero-order hold (ZOH) and a time delay are reflected.

When a transfer function for a control algorithm of the controller to be implemented in the digital inverter is defined as $G_c(s)$ through the Laplace transform, the entire signal processing for the input and output of the digital inverter, including the discrete time operation of the digital inverter, is shown in FIG. 5.

FIG. 5 is a conceptual diagram illustrating a digital inverter to which a conventional ZOH and a time delay are reflected.

Therefore, the final relational expression for the input and output of the digital inverter may be integrated in the continuous time domain to be expressed as Equation 3, and when a control algorithm $G_c(s)$ of a controller 510 is designed in the form of Equation 3, ZOHs and time delays of a ZOH unit 520 and a time delay unit 530 of the digital inverter 500 should be reflected.

$$T_s(s) = G_c(s) G_{ZOH}(s) G_d(s) \qquad \text{[Equation 3]}$$
$$= G_c(s) \frac{1 - e^{-sT_{samp}}}{s} e^{-sT_{samp}}$$

Figure 6:
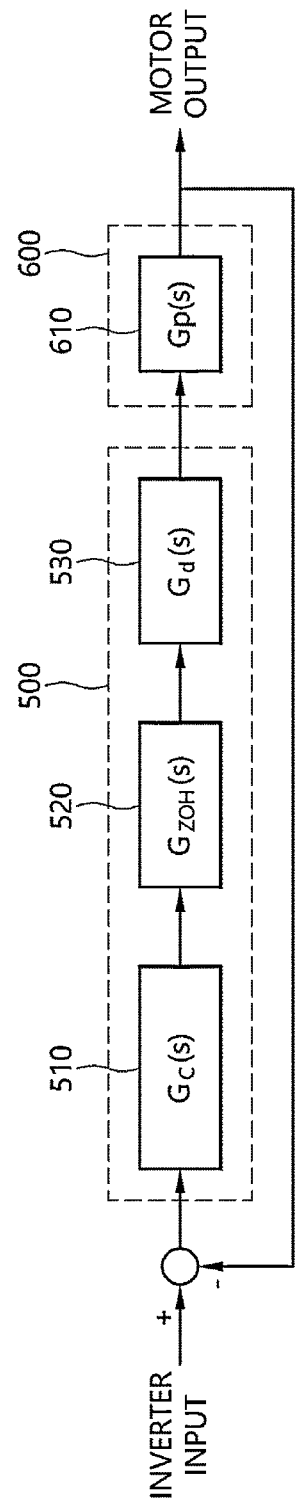
FIG. 6 is an exemplary diagram for describing a control closed loop circuit of a digital inverter including a motor.

FIG. 6 is an exemplary diagram for describing a control closed loop circuit of a digital inverter including a motor, and it can be seen that, in addition to the ZOH unit 520 and the time delay unit 530, an item to be considered in designing the control algorithm of the controller 510 is modeling for a motor 600.

Therefore, it can be said that the performance of the inverter control apparatus depends on accuracy of the modeling even for the same motor.

Figure 7:
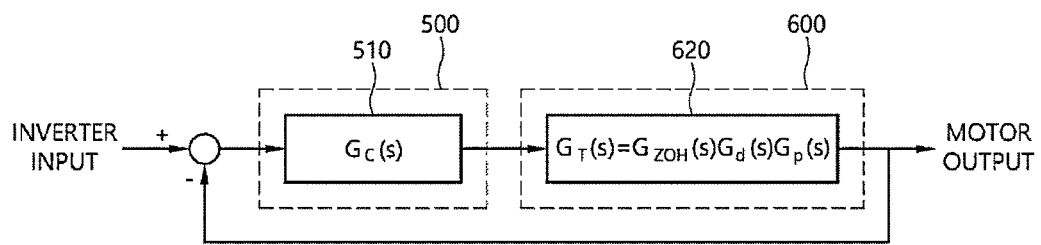
FIG. 7 is an exemplary diagram illustrating that of FIG. 6 simplified in terms of a control algorithm of a controller.

FIG. 7 is an exemplary diagram illustrating that of FIG. 6 simplified in terms of a control algorithm of a controller.

That is, in terms of the control algorithm of the controller 510, it can be seen that a control closed loop block diagram may be represented to be modified into one block 620 by combining a motor modeling unit 610 of the motor 600 into items obtained by considering the ZOH and the time delay.

Generally, the three-phase alternating-current (AC) motor 600 is modeled in the form of d-axis and q-axis signals through coordinate transformation. There are various types of the AC motor 600. Among the various types of the AC motor 600, an example of a surface-attached permanent magnet motor will be described.

An output voltage equation of the motor is expressed as a voltage equation of the motor in a continuous-time stationary coordinate system as in Equation 4 below.

$$\begin{bmatrix} V_{ds}^s \\ V_{qs}^s \end{bmatrix} = R_s \begin{bmatrix} i_{ds}^s \\ i_{qs}^s \end{bmatrix} + \frac{d}{dt}\left( \begin{bmatrix} L_s & 0 \\ 0 & L_s \end{bmatrix}\begin{bmatrix} i_{ds}^s \\ i_{qs}^s \end{bmatrix} + \lambda_{PM}\begin{bmatrix} \cos\theta_r \\ \sin\theta_r \end{bmatrix} \right) \qquad \text{[Equation 4]}$$

In Equation 4, $V_{ds}^s$ denotes a d-axis input voltage on the stationary coordinate system, $V_{qs}^s$ denotes a q-axis input voltage on the stationary coordinate system, $i_{ds}^s$ denotes a d-axis output current on the stationary coordinate system, and $i_{qs}^s$ denotes a q-axis output current on the stationary coordinate system. In addition, $R_s$ denotes resistance of a motor stator, $L_s$ denotes inductance of the motor stator, $\lambda_{PM}$ denotes magnetic flux interlinkage of a permanent magnet, and $\theta_r$ denotes a position of the permanent magnet of the motor.

Alternatively, the voltage equation on the synchronous coordinate system may also be obtained in the form of Equation 6 through coordinate transformation synchronized with the position of the motor expressed as Equation 5.

$$R(\theta_e) = \begin{bmatrix} \cos\theta_e & \sin\theta_e \\ -\sin\theta_e & \cos\theta_e \end{bmatrix} \qquad \text{[Equation 5]}$$
$$= \begin{bmatrix} \cos(\omega_e T_{samp}) & \sin(\omega_e T_{samp}) \\ -\sin(\omega_e T_{samp}) & \cos(\omega_e T_{samp}) \end{bmatrix}$$

$$\begin{bmatrix} V_{ds}^e \\ V_{qs}^e \end{bmatrix} = \qquad \text{[Equation 6]}$$
$$R_s \begin{bmatrix} i_{ds}^e \\ i_{qs}^e \end{bmatrix} + \begin{bmatrix} L_s & 0 \\ 0 & L_s \end{bmatrix}\frac{d}{dt}\begin{bmatrix} i_{ds}^e \\ i_{qs}^e \end{bmatrix} + \omega_e\begin{bmatrix} 0 & -L_s \\ L_s & 0 \end{bmatrix}\begin{bmatrix} i_{ds}^e \\ i_{qs}^e \end{bmatrix} + \begin{bmatrix} 0 \\ \omega_e\lambda_{PM} \end{bmatrix}$$

In this case, $V_{ds}^e$ denotes a d-axis input voltage on the synchronous coordinate system, $V_{qs}^e$ denotes a q-axis input voltage on the synchronous coordinate system, $i_{ds}^e$ denotes a d-axis output current on the synchronous coordinate system, and $i_{qs}^e$ denotes a q-axis output current on the synchronous coordinate system. In addition, $\theta_e$ denotes a position of the motor rotor, and $\omega_e$ denotes a speed of the motor rotor.

That is, various types of expressions are possible for the same motor.

When the Laplace transform is applied to the voltage equations of Equations 4 and 6 to obtain a relational expression of an output current to a voltage input of the motor, the relational expression may be expressed as transfer functions of Equations 7 and 8.

$$G_P^s(s) = \frac{i_{dqs}^s}{V_{dqs}^s} = \frac{1}{L_s s + R_s} \quad \text{[Equation 7]}$$

$$G_P^e(s) = \frac{i_{dqs}^e}{V_{dqs}^e} = \frac{1}{L_s s + R_s + j\omega_e L_s} \quad \text{[Equation 8]}$$

On the basis of the modeling of the motor 610 as in Equation 7 or Equation 8, the control algorithm $G_c(s)$ of the controller 510 is designed through analysis of a closed loop circuit of FIG. 6. In FIG. 6, $G_p(s)$ refers to $G_p^s(s)$ or $G_p^e(s)$ in Equations 7 and 8.

Thus, when Equations 7 and 8 are used, it is possible to determine a transfer function of the control closed loop modified in one block 610 in which the ZOH and delay effects of FIG. 7 and the motor modeling are combined.

$$G_T(s) = G_{ZOH}(s) G_d(s) G_P(s) \quad \text{[Equation 9]}$$

$$= \frac{1 - e^{-sT_{samp}}}{s} e^{-sT_{samp}} \frac{1}{L_s s + R_s + j\omega_e L_s}$$

In a conventional system, the voltage equation on the synchronous coordinate system of Equation 8 is used for the motor modeling. In this case, when dynamic characteristics of a current command $i_{dqs}^{e*}$ corresponding to the input of the inverter and an actual current $i_{dqs}^e$ corresponding to the output of the motor are designed as in Equation 10, a relational expression shown in Equation 11 may be derived through the system shown in FIG. 7.

$$\frac{i_{dqs}^e}{i_{dqs}^{e*}} = G_{closed}(s) \quad \text{[Equation 10]}$$

$$\frac{i_{dqs}^e}{i_{dqs}^{e*}} = G_{closed}(s) = \frac{G_c(s) G_T(s)}{1 + G_c(s) G_T(s)} \quad \text{[Equation 11]}$$

That is, when the relational expression of Equation 11 is utilized through a known $G_T(s)$ and $G_{closed}^{(s)}$ directly designed by the user, the control algorithm $G_c(s)$ of the controller 510 may be determined in the form of Equation 12.

$$\frac{i_{dqs}^e}{i_{dqs}^{e*}} = G_{closed}(s) = \frac{G_c(s) G_T(s)}{1 + G_c(s) G_T(s)} \quad \text{[Equation 12]}$$

In this case, in order to implement the control algorithm of the controller 510 in the digital inverter 500, a transfer function in the discrete time domain is required instead of a transfer function in the continuous time domain. Therefore, in order to discretize the relational expression of Equation 11, a control algorithm $G_c(z)$, which is capable of being finally implemented in a discretized form by applying a z transform to $G_{closed}(s)$ and $G_T(s)$, is designed as in Equation 13.

In this case, the z transform transforms a signal in the time domain represented as a real number sequence or a complex number sequence in signal processing into an expression in a complex frequency domain, and the z transform may be referred to as a transformation into a discrete time domain corresponding to the Laplace transform for a continuous time signal. The description thereof is well known to those skilled in the art to which the present disclosure pertains, and thus a detailed description thereof will be omitted herein.

$$G_c(z) = \frac{G_{closed}(z)}{G_T(z)(1 - G_{closed}(z))} \quad \text{[Equation 13]}$$

Specifically, when the dynamic characteristic of the actual current with respect to the current command is designed using a low-pass filter as in Equation 14, the control algorithm $G_c(z)$ of the controller 510 as in Equation 16 may be designed through $G_T(z)$ of Equation 15.

$$G_{closed}(z) = \frac{K}{z^2 - z + K} \quad \text{[Equation 14]}$$

$$G_T(z) = Z\{G_{ZOH}(s) G_d(s) G_P(s)\} \quad \text{[Equation 15]}$$

$$= \frac{R_s - j\omega_e L_s}{R_s^2 + \omega_e^2 L_s^2} \frac{1 - e^{-(R_s/L_s + j\omega_e)T_{samp}}}{z(z - e^{-(R_s/L_s + j\omega_e)T_{samp}})}$$

$$G_c(z) = \frac{K(R_s^2 + \omega_e^2 L_s^2)(z - e^{-(R_s/L_s + j\omega_e)T_{samp}})}{(R_s - j\omega_e L_s)(1 - e^{-(R_s/L_s + j\omega_e)T_{samp}})(z - 1)} \quad \text{[Equation 16]}$$

In this case, K used in the above equations denotes a controller variable.

Figure 8:
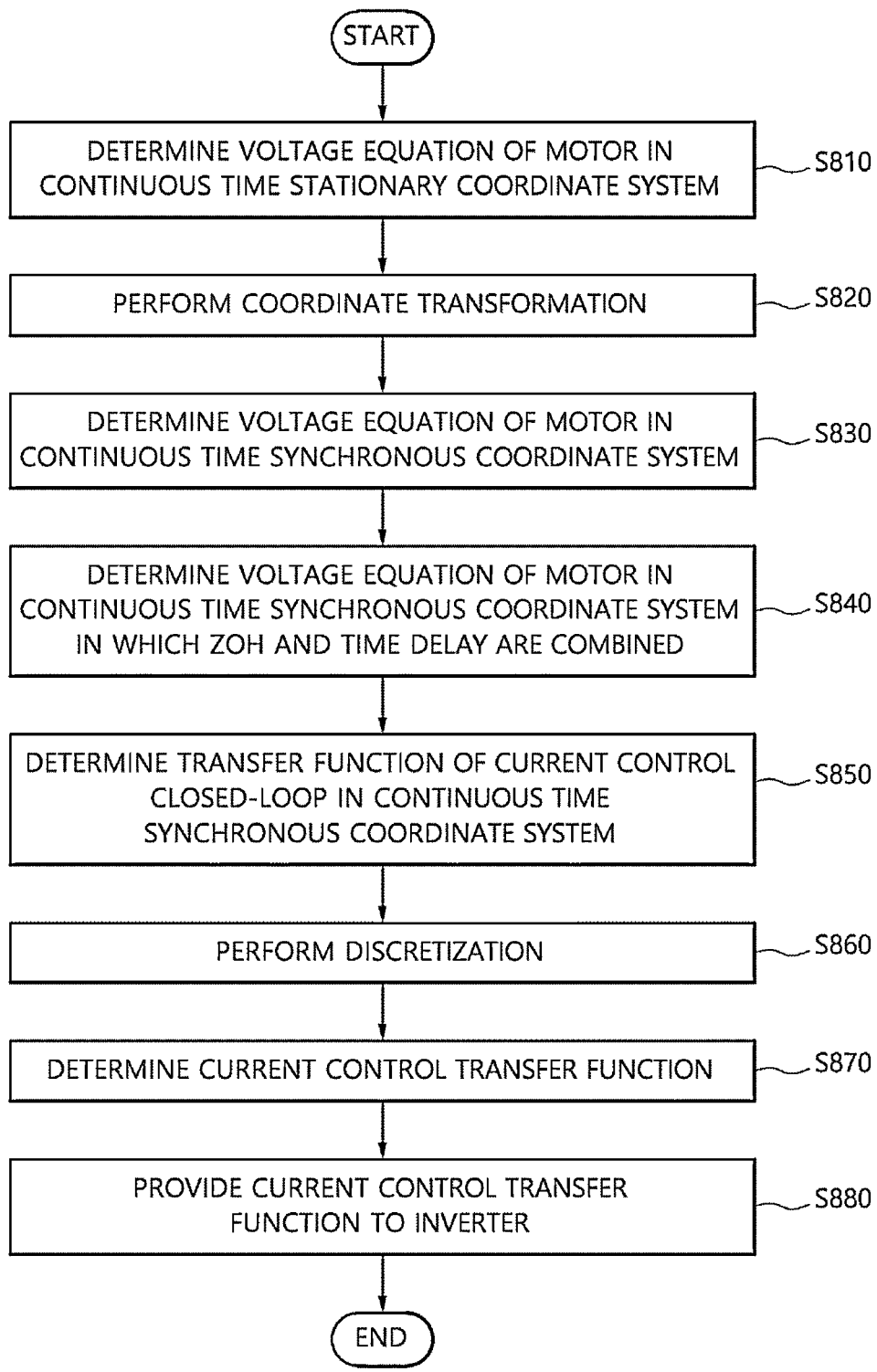
FIG. 8 is a flowchart for describing an inverter control method according to a related art.

FIG. 8 is a flowchart for describing an inverter control method according to a related art.

In a conventional high-speed inverter system, since the sampling period is not sufficiently fast, a sampling phenomenon should be considered. Therefore, a description will be made based on the modeling of the inverter 500 and the motor 600, to which the ZOH and the delay are reflected, of FIG. 7.

In a conventional inverter 500, a voltage equation of the motor on a stationary coordinate system is determined in the continuous time domain (S810). This is expressed as Equation 4. Thereafter, coordinate transformation is performed through Equation 5 (S820), and the voltage equation of the motor on the synchronous coordinate system may be determined in the continuous time domain (S830). This is expressed as Equation 6.

Then, the voltage equation of the motor on the synchronous coordinate system is determined as in Equation 9 in the continuous time domain in which the ZOH and the time delay are combined (S840), and a transfer function of the current control closed-loop on the synchronous coordinate system is determined as in Equation 11 in the continuous time domain (S850).

Thereafter, the transfer function of the current control closed loop on the synchronous coordinate system is discretized in the continuous time domain to determine the transfer function of the current control closed loop on the synchronous coordinate system in the discrete time domain as in Equation 12 (S860), and by using the voltage equation of the motor on the synchronous coordinate system in the continuous time domain, in which the transfer function of the current control response characteristic in the discrete time domain of Equation 14 and the discretized ZOH and time delay of Equation 15 are combined, a current control transfer function of the inverter is determined as in Equation 16 (S870) and then transmitted to the inverter (S880).

In this case, the voltage equation of Equation 6 on the synchronous coordinate system, which corresponds to the last operation of the motor modeling, is derived through the coordinate transformation of Equation 5 to the voltage equation of Equation 4 on the stationary coordinate system. In this case, in the coordinate transformation equation of Equation 5, it can be seen that the sampling period is used as a variable. That is, a result of the coordinate transformation is varied according to the sampling period.

However, it can be seen that the sampling period is not included in the voltage equation of Equation 6 on the synchronous coordinate system. This is because the voltage equation is derived from Equation 4 on the premise that the sampling period is sufficiently fast.

Therefore, according to a conventional control method, a sampling phenomenon for the coordinate transformation is not considered, and thus there is a problem of causing an error in the derivation result of the discretized $G_T(z)$ of Equation 15.

That is, the conventional system is not a problem in a general inverter control system in which the sampling period is sufficiently short, whereas in a high-speed current control system, accuracy of modeling for the system is reduced, and thus there is a problem in that convergence of the inverter controller on the command is degraded and a stable operation range is limited.

Therefore, the system according to one embodiment of the present disclosure is for improving modeling accuracy by reflecting the sampling effect on the coordinate transformation and for securing command convergence performance and stability of the inverter controller in a condition of a lower sampling index.

Figure 9:
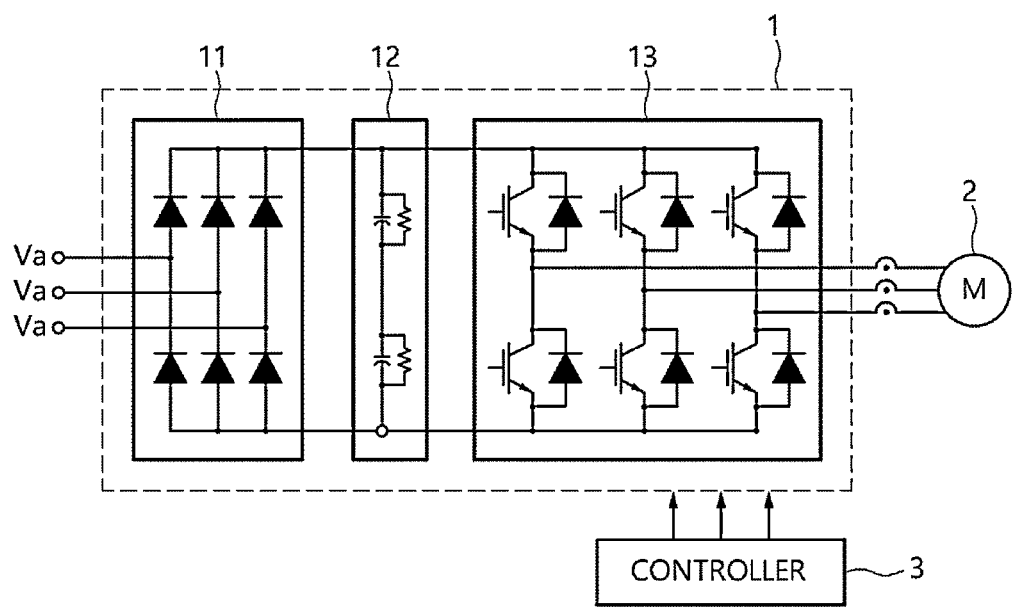
FIG. 9 is a block diagram illustrating an inverter system to which an inverter control apparatus is applied according to one embodiment of the present disclosure.

FIG. 9 is a block diagram illustrating an inverter system to which an inverter control apparatus is applied according to one embodiment of the present disclosure.

As shown in the drawing, the inverter system of one embodiment of the present disclosure may include a controller 3 for transmitting an on/off control signal to an inverter part 13 of an inverter 1, which drives a motor 2.

The inverter 1 may include a rectifier 11 for rectifying a three-phase AC power which is input, a smoothing part 12 for smoothing and storing a direct-current (DC) voltage rectified by the rectifier 11, and the inverter part 13 for outputting the DC voltage stored in the smoothing part 12 as an AC voltage having a predetermined voltage and a frequency according to a control signal of the controller 3. The AC voltage output from the inverter part 13 is provided to the motor 2.

Figure 10:
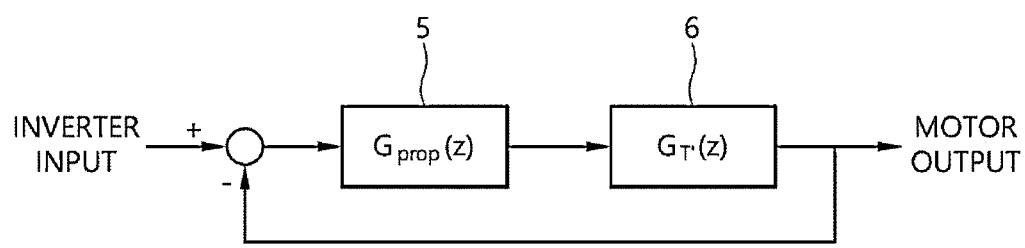
FIG. 10 is a schematic exemplary diagram illustrating a controller and a motor of FIG. 9, which are modeled in a discrete time domain.

FIG. 10 is a schematic exemplary diagram illustrating the controller 3 and the motor 2 of FIG. 9, which are modeled in a discrete time domain that is shown to correspond to FIG. 7 according to the related art, and may include a control modeling part 5 and a motor modeling part 6.

The motor modeling part 6 may combine the voltage equation on the stationary coordinate system of Equation 7 with the ZOH and delay effects of Equations 1 and 2 to obtain a result for the motor modeling as in Equation 17.

$$G_T(s) = G_{ZOH}(s)G_d(s)G_P(s) \qquad [\text{Equation 17}]$$
$$= \frac{1 - e^{-sT_{samp}}}{s} e^{-sT_{samp}} \frac{1}{L_s s + R_s}$$

Z-transform is performed to discretize Equation 17 as follows.

$$G_T(z) = Z\{G_{ZOH}(s)G_d(s)G_P(s)\} \qquad [\text{Equation 18}]$$
$$= \frac{1}{R_s} \frac{1 - e^{-R_s T_{samp}/L_s}}{z(z - e^{-R_s T_{samp}/L_s})}$$

Thereafter, when coordinate transformation is performed on Equation 5 in a discrete domain, a voltage equation on the synchronous coordinate system, in which a ZOH and a time delay for a discrete time are combined, may be determined as in Equation 19.

$$G_{T'}(z) = G_T(z e^{j\omega_e T_{samp}}) \qquad [\text{Equation 19}]$$
$$= \frac{1}{R_s} \frac{1 - e^{-R_s T_{samp}/L_s}}{z e^{j\omega_e T_{samp}}(z e^{j\omega_e T_{samp}} - e^{-R_s T_{samp}/L_s})}$$

Then, by utilizing the closed loop of FIG. 10, a transfer function of a current control closed loop on the synchronous coordinate system may be obtained as in Equation 20.

$$\frac{i_{dqs}^e}{i_{dqs}^{e*}} = G_{closed}(z) = \frac{G_{prop}(z)G_{T'}(z)}{1 + G_{prop}(z)G_{T'}(z)} \qquad [\text{Equation 20}]$$

When Equation 20 is expressed as $G_{prop}(z)$, Equation 21 is obtained, and when the dynamic characteristic of the actual current with respect to the current command is designed using a low-pass filter as in Equation 14, an algorithm of the control modeling part 5 may be derived as in Equation 22.

$$G_{prop}(z) = \frac{G_{closed}(z)}{G_{T'}(z)(1 - G_{closed}(z))} \qquad [\text{Equation 21}]$$

$$G_{prop}(z) = \frac{KR_s e^{j2\omega_e T_{samp}}}{(1 - e^{-R_s T_{samp}/L_s})} \frac{z - z_0}{z - 1}, \qquad [\text{Equation 22}]$$
$$z_0 = e^{-R_s T_{samp}/L_s - j\omega_e T_{samp}}$$

In this case, K denotes the controller variable and denotes the dynamic characteristic of the actual current with respect to the current command.

When Equation 22 is compared with Equation 16, it can be seen that the sampling effect, which is not considered in the coordinate transformation in Equation 16, is reflected and it can be seen that the control variable K is used as in Equation 16.

Therefore, according to the control modeling part 5 of one embodiment of the present disclosure, complexity is the same as in the related art, whereas accuracy of the system modeling is increased so that the current control performance can be improved.

Figure 11:
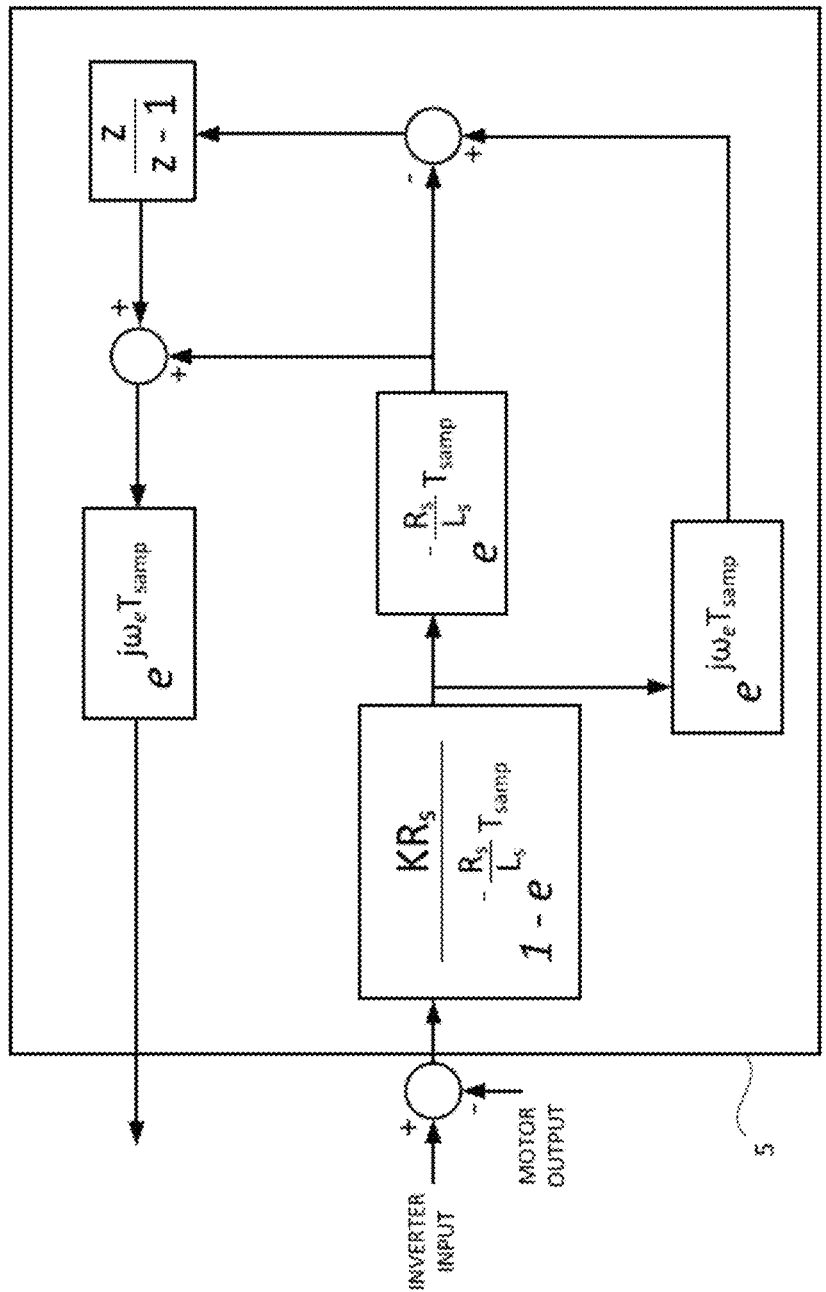
FIG. 11 is a detailed block diagram illustrating the inverter control apparatus according to one embodiment of the present disclosure.

FIG. 11 is a detailed block diagram illustrating the inverter control apparatus according to one embodiment of the present disclosure that shows an exemplary diagram in which Equation 22 is implemented.

Figure 12:
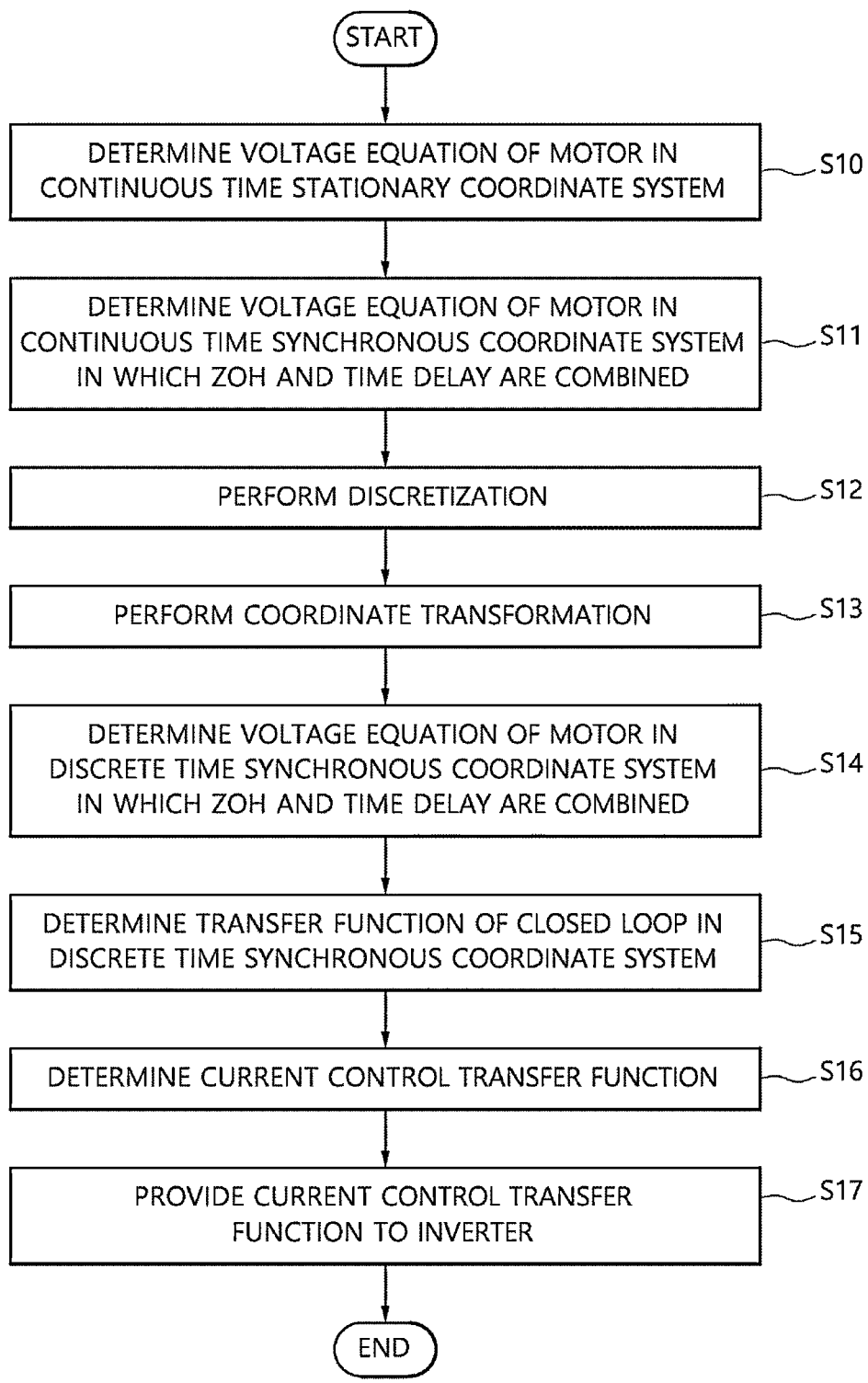
FIG. 12 is a flowchart for describing an inverter control method according to one embodiment of the present disclosure.

FIG. 12 is a flowchart for describing an inverter control method according to one embodiment of the present disclosure.

As shown in the drawings, in one embodiment of the present disclosure, the control modeling part 5 may determine a voltage equation of the motor on the stationary coordinate system as in Equation 7 in the continuous time domain (S10).

Then, the control modeling part 5 may determine the voltage equation of the motor in the continuous time stationary coordinate system, in which the ZOH and the time delay are combined, as in Equation 17 (S11), discretize the voltage equation of the motor, and determine a voltage equation of the motor in the discrete time stationary coordinate system, in which the ZOH and the time delay are combined, as in Equation 18 (S12).

Thereafter, the control modeling part 5 may perform coordinate transformation using Equation 5 (S13) and determine a voltage equation of the motor in a discrete time synchronous coordinate system, in which the ZOH and the time delay are combined, as in Equation 19 (S14).

Then, when a dynamic characteristic of the actual output current for the current command is designed using a low-pass filter, the control modeling part 5 may determine a transfer function of a current control closed loop in the discrete time synchronous coordinate system as in Equation 20 from the transfer function of the discrete time current control response characteristic of Equation 14 (S15).

In addition, the control modeling part 5 may determine a transfer function of the current control as in Equation 22 from the transfer function of the current control closed loop of Equation 20 (S16) and provide the transfer function of the current control to the inverter 1.

Figure 13:
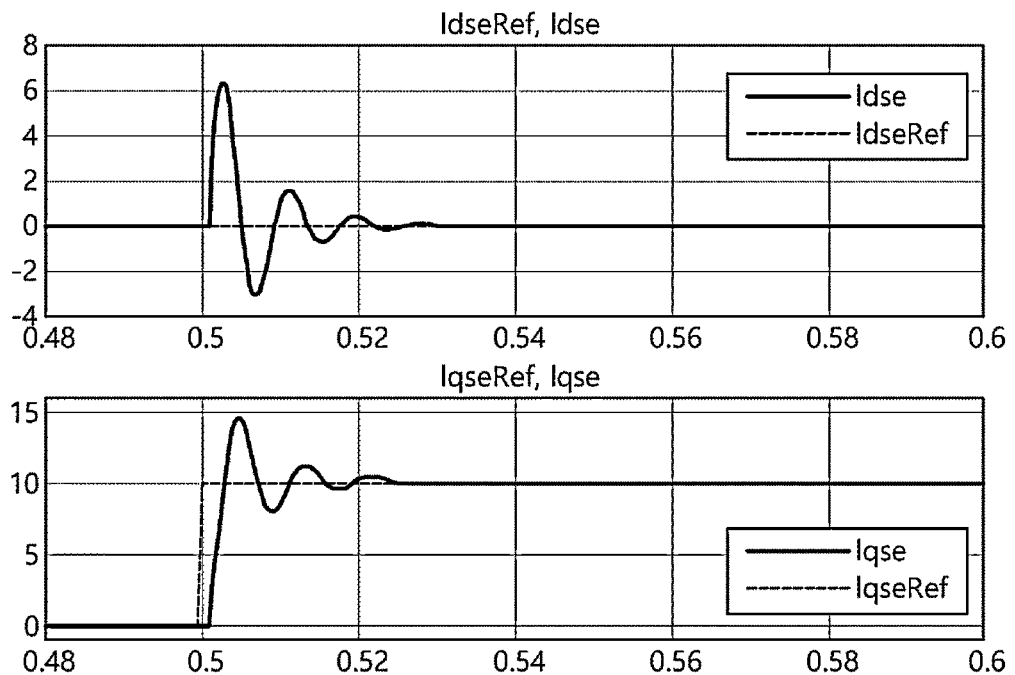
FIG. 13 shows exemplary diagrams illustrating a relationship between a command current and an output current according to a conventional control method.
Figure 14:
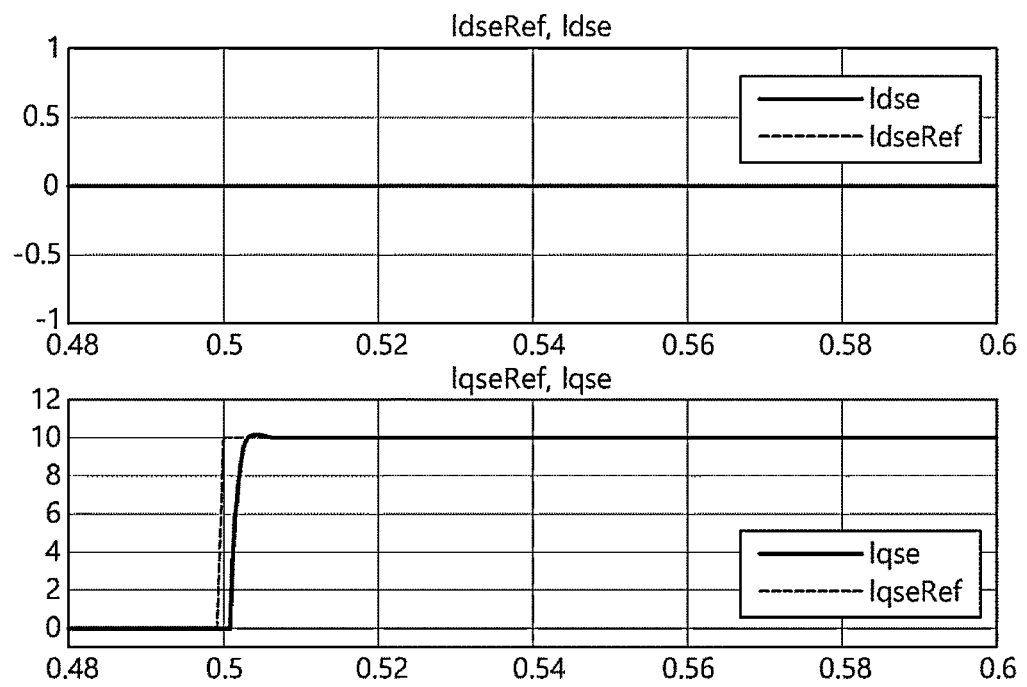
FIG. 14 shows exemplary diagrams illustrating a relationship between a command current and an output current according to a control method of one embodiment of the present disclosure.

FIG. 13 shows exemplary diagrams illustrating a relationship between a command current and an output current according to a conventional control method, FIG. 14 shows exemplary diagrams illustrating a relationship between a command current and an output current according to a control method of one embodiment of the present disclosure, and each drawing shows a condition in which a sampling frequency is 2 kHz and an operating frequency is 500 Hz, that is, a condition in which a sampling index is four. In FIGS. 13 and 14, IdseRej and IqseRej denote a current command, and Idse and Iqse denote an actual current.

Referring to FIG. 13, according to the related art, it can be seen that a ripple occurs in the actual current, whereas according to the control method of the present disclosure of FIG. 14, it can be seen that convergence of the actual current on the current command is improved and stability of the actual current is also improved.

As described above, according to one embodiment of the present disclosure, the coordinate transformation is performed in the discrete time domain during the system modeling so that the sampling effect can be reflected in the system modeling, and the current command convergence and stability can be improved.

While the present disclosure has been described with reference to embodiments thereof, the embodiments are merely illustrative and it should be understood that various modifications and equivalent embodiments can be derived by those who skilled in the art. Accordingly, the true technical scope of the present disclosure should be determined by the appended claims.

What is claimed is:

1. An inverter control method in which a controller turns on and off a plurality of switching devices that output an alternating-current (AC) voltage of an inverter using a transfer function of current control, which is a control signal in a discrete time domain, the inverter control method comprising:
generating the transfer function of current control by reflecting a zero-order hold (ZOH) and a time delay and a rotor position and speed of a motor; and
controlling the inverter using the transfer function of current control, wherein generating the transfer function of current control comprises:
generating a first voltage equation for a motor on a stationary coordinate system in a continuous time domain;
reflecting the ZOH and the time delay to the first voltage equation and generating a second voltage equation;
discretizing the second voltage equation and generating a third voltage equation;
reflecting a rotor position and a speed of the motor and generating a fourth voltage equation on a synchronous coordinate system in the discrete time domain;
generating a transfer function of a current control closed-loop on the synchronous coordinate system in the discrete time domain from a transfer function of a current control response characteristic in the discrete time domain; and
generating the transfer function of current control using the transfer function of the current control closed-loop and the fourth voltage equation.

2. The inverter control method of claim 1, wherein the first voltage equation is determined by the following equation:

$$G_p(s) = \frac{i^s_{dqs}}{V^s_{dqs}} = \frac{1}{L_s s + R_s},$$

wherein $G_p(s)$ denotes the voltage equation on the stationary coordinate system, $V_{dqs}^s$ denotes an input voltage on the stationary coordinate system, $i_{dqs}^s$ denotes an output current on the stationary coordinate system, $R_s$ denotes rotor resistance of the motor, and $L_s$ denotes rotor inductance of the motor, and s denotes an operator corresponding to the Laplace transform.

3. The inverter control method of claim 1, wherein the second voltage equation is determined by the following equation:

$$G_T(s) = G_{ZOH}(s)G_d(s)G_p(s) = \frac{1-e^{-sT_{samp}}}{s}e^{-sT_{samp}}\frac{1}{L_s s + R_s},$$

wherein $G_{ZOH}(s)$ denotes a transfer function to which the ZOH is reflected, $G_d(s)$ denotes a transfer function to which the time delay is reflected, $G_p(s)$ denotes the voltage equation on the stationary coordinate system, $T_{samp}$ denotes a sampling period, $R_s$ denotes rotor resistance of the motor, $L_s$ denotes rotor inductance of the motor, and s denotes an operator corresponding to the Lapace transform.

4. The inverter control method of claim 1, wherein the third voltage equation is determined by the following equation:

$$G_T(z) = Z\{G_{ZOH}(s)G_d(s)G_P(s)\} = \frac{1}{R_s}\frac{1-e^{-R_s T_{samp}/L_s}}{z(z-e^{-R_s T_{samp}/L_s})},$$

wherein $G_{ZOH}(s)$ denotes a transfer function to which the ZOH is reflected, $G_d(s)$ denotes a transfer function to which the time delay is reflected, $G_p(s)$ denotes the voltage equation on the stationary coordinate system, $T_{samp}$ denotes a sampling period, $R_s$ denotes rotor resistance of the motor, $L_s$ denotes rotor inductance of the motor, and z denotes a complex frequency.

5. The inverter control method of claim 1, wherein the fourth voltage equation is determined by the following equation:

$$G_{T'}(z) = G_T(ze^{j\omega_e T_{samp}}) = \frac{1}{R_s}\frac{1-e^{-R_s T_{samp}/L_s}}{ze^{j\omega_e T_{samp}}(ze^{j\omega_e T_{samp}} - e^{-R_s T_{samp}/L_s})},$$

wherein $T_{samp}$ denotes a sampling period, $R_s$ denotes rotor resistance of the motor, $L_s$ denotes rotor inductance of the motor, z denotes a complex frequency, and We denotes a rotor speed of the motor.

6. The inverter control method of claim 1, wherein the current control response characteristic in the discrete time domain is designed using a low-pass filter.

7. The inverter control method of claim 6, wherein the current control response characteristic is determined by the following equation:

$$G_{closed}(z) = \frac{K}{z^2 - z + K},$$

wherein K denotes a dynamic characteristic of an actual current with respect to a current command, and z denotes a complex frequency.

8. The inverter control method of claim 1, wherein the transfer function of the current control is determined by the following equation:

$$G_{prop}(z) = \frac{KR_s e^{j\omega_e T_{samp}}}{(1-e^{-R_s T_{samp}/L_s})}\frac{z-z_0}{z-1}, z_0 = e^{-R_s T_{samp}/L_s - j\omega_e T_{samp}},$$

wherein $T_{samp}$ denotes a sampling period, $R_s$ denotes rotor resistance of the motor, $L_s$ denotes rotor inductance of the motor, z denotes a complex frequency, We denotes a rotor speed of the motor, and K denotes a control variable.

9. An inverter control method in which a controller turns on and off a plurality of switching devices that output an alternating-current (AC) voltage of an inverter using a transfer function of current control, which is a control signal in a discrete time domain, the inverter control method comprising:

generating the transfer function of current control by reflecting a zero-order hold (ZOH) and a time delay and a rotor position and speed of a motor; and controlling the inverter using the transfer function of current control, wherein the generating the transfer function of current control comprises:

discretizing a voltage equation for a motor on a stationary coordinate system, in which the ZOH and the time delay are reflected, in a continuous time domain;

reflecting a rotor position and a speed of the motor and generating a voltage equation of the motor on a synchronous coordinate system in a discrete time domain; and generating the transfer function of current control using the voltage equation.

10. An inverter control apparatus comprising:

a rectifier configured to rectify alternating-current (AC) power;

a smoothing part configured to smooth and store a direct-current (DC) voltage rectified by the rectifier;

an inverter part in which a plurality of switching devices are disposed according to a predetermined topology and which outputs the DC voltage stored in the smoothing part as an AC voltage of a predetermined voltage and a frequency; and a controller configured to generate a transfer function of current control, which is a control signal in a discrete time domain, in order to turn the plurality of switching devices on and off, an configured to control the invert using the transfer function of current control, wherein the controller discretizes a voltage equation for a motor on a stationary coordinate system, in which a zero-order hold (ZOH) and a time delay are reflected, in a continuous time domain and reflects a rotor position and a speed of the motor to generate a voltage equation for the motor on a synchronous coordinate system in the discrete time domain, and generate the transfer function of current control using the voltage equation.

11. The inverter control apparatus of claim 10, wherein the controller generates a first voltage equation for the motor on the stationary coordinate system in a continuous time domain, reflects the ZOH and the time delay to the first voltage equation and generates a second voltage, discretizes the second voltage equation and generates a third voltage, reflects the rotor position and the speed of the motor and determines a fourth voltage equation on the synchronous coordinate system in the discrete time, generates a transfer function of a current control closed-loop on the synchronous coordinate system in the discrete time domain from a transfer function of a current control response characteristic in the discrete time domain, and generates a transfer function of current control using the transfer function of the current control closed-loop and the fourth voltage equation.

* * * * *